(No Model.)
F. MÜLLER.
EYEGLASSES.
No. 392,522. Patented Nov. 6, 1888.
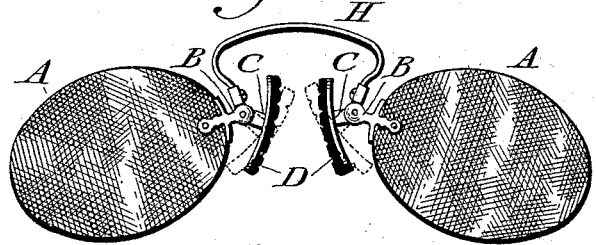
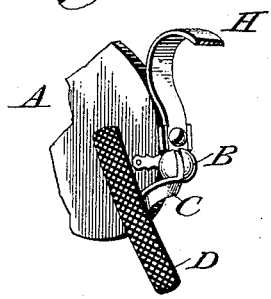
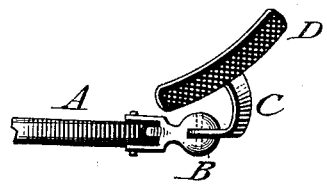
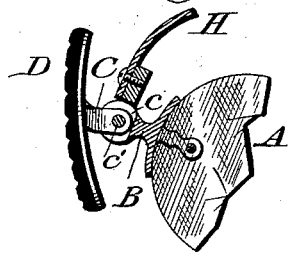
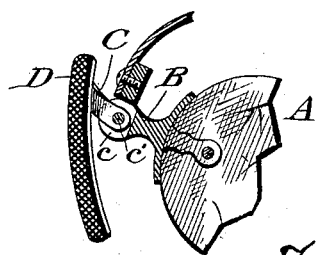
Witnesses,
Frank Müller.
Inventor,
By his Attorneys

UNITED STATES PATENT OFFICE.

FRANK MÜLLER, OF PHILADELPHIA, PENNSYLVANIA.

EYEGLASSES.

SPECIFICATION forming part of Letters Patent No. 392,522, dated November 6, 1888.

Application filed July 2, 1888. Serial No. 278,825. (No model.)

*To all whom it may concern:*

Be it known that I, FRANK MÜLLER, a citizen of the United States, residing in the city and county of Philadelphia, and State of Pennsylvania, have invented certain new and useful Improvements in Eye Glasses, of which the following is a specification.

My invention relates to eye glasses with off-set adjustable nose pieces and its object is to provide means which are self adjustable, cheap, simple, and satisfactory in operation, of attaching such nose pieces to the glasses.

An eye glass embodying my invention is represented in the accompanying drawings and described in this specification, the particular subject matter claimed as novel being hereinafter definitely specified.

In the drawings, Figure 1 is an elevational view of a pair of eye glasses embodying my improvements. Fig. 2 is an enlarged fragmentary plan detail of a nose piece embodying my invention, representing particularly its mode of attachment to the clamp post. Fig. 3 is a fragmentary side elevational detail of the same, a portion of the stud or post being in section to illustrate construction. Fig. 4 is a view similar to Fig. 3, representing the arm secured to the nose piece near one end thereof. Fig. 5 is a fragmentary perspective view of a nose piece embodying my invention.

Similar letters of reference indicate corresponding parts.

In the drawings, A A are the lenses of a pair of eye glasses. These lenses are as is usual provided with studs or posts B B, which may be either attached direct to the lenses or to rims of eye glasses, and to which studs the ends of the bridge or uniting bow H are attached, in any preferred manner. The clamp posts B are preferably cast of solid metal, and in the outer end of each is formed a mortise or slot $c$ of suitable size and shape to receive the inner end of an off-set plate C, and to allow of the vertical rocking movement of the off-set plate and attached nose piece.

D is the nose piece, and C as stated the off-set plate, the latter at its outer end being attached to and supporting the nose piece in any desired manner. The off-set plate is bent to such form as is necessary to bring the nose piece with which it is equipped into the proper plane to serve the purpose for which it is made,—and its inner end is retained flat, is entered within the slot $c$, and secured therein by the pivot $c'$. The slot $c$ should be of such width as to snugly contain the end of the off-set plate, leaving it however free to rotate on its pivot but not leaving room for it to move to one side or the other in the direction of the length of the pivot. The pivot joints thus formed are strong, durable, and not under ordinary conditions liable to work loose.

By my invention the necessarily somewhat large size of the clamp post is utilized to furnish a broad cheek piece for each side of the off-set plate.

I am aware that I am not the first to pivotally attach a nose piece to eye glasses and to such an invention broadly I lay no claim, but

What I claim and desire to secure by Letters Patent is:—

In an eye glass, the combination of two posts each of which supports a lens or its frame and an extremity of the lens-connecting bow-spring and each of which is slotted at its outer extremity, a bow-spring, a pair of nose rests independent of the bow spring and respectively provided with off-set plates which are respectively entered within the slots of the posts, and pivots passing transversely through the respective posts and off-set plates, substantially as and for the purposes set forth.

In testimony that I claim the foregoing as my invention I have hereunto signed my name this 15th day of June, A. D. 1888.

FRANK MÜLLER.

In the presence of
　J. BONSALL TAYLOR,
　F. NORMAN DIXON.